(12) United States Patent
Niimoto

(10) Patent No.: US 10,221,332 B2
(45) Date of Patent: Mar. 5, 2019

(54) TWO-COMPONENT-TYPE PRIMER, PRIMER COATING FILM, LAYERED ANTIFOULING COATING FILM, AND METHOD FOR PREVENTING BASE MATERIAL FROM BEING FOULED

(71) Applicant: CHUGOKU MARINE PAINTS, LTD., Otake-shi (JP)

(72) Inventor: Jyunji Niimoto, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 219 days.

(21) Appl. No.: 14/760,803

(22) PCT Filed: Jan. 31, 2014

(86) PCT No.: PCT/JP2014/052306
§ 371 (c)(1),
(2) Date: Jul. 14, 2015

(87) PCT Pub. No.: WO2014/119741
PCT Pub. Date: Aug. 7, 2014

(65) Prior Publication Data
US 2015/0368506 A1    Dec. 24, 2015

(30) Foreign Application Priority Data
Feb. 4, 2013    (JP) ................................. 2013-019513

(51) Int. Cl.
| | | |
|---|---|---|
| C09D 163/04 | (2006.01) |
| B32B 15/08 | (2006.01) |
| B63H 1/28 | (2006.01) |
| C09D 5/00 | (2006.01) |
| C09D 5/16 | (2006.01) |
| B32B 13/04 | (2006.01) |
| B32B 13/02 | (2006.01) |
| B05D 7/14 | (2006.01) |
| B05D 7/00 | (2006.01) |
| C09D 5/08 | (2006.01) |
| C08G 59/50 | (2006.01) |
| C08L 63/00 | (2006.01) |
| C08L 63/04 | (2006.01) |
| C09D 7/40 | (2018.01) |
| C08K 3/30 | (2006.01) |
| C08K 3/013 | (2018.01) |
| C09D 163/00 | (2006.01) |

(52) U.S. Cl.
CPC ............. *C09D 163/04* (2013.01); *B05D 7/14* (2013.01); *B05D 7/544* (2013.01); *B05D 7/546* (2013.01); *B32B 13/02* (2013.01); *B32B 13/042* (2013.01); *B32B 15/08* (2013.01); *B63H 1/28* (2013.01); *C08G 59/50* (2013.01); *C08G 59/5033* (2013.01); *C08L 63/00* (2013.01); *C08L 63/04* (2013.01); *C09D 5/00* (2013.01); *C09D 5/08* (2013.01); *C09D 5/16* (2013.01); *C09D 5/1693* (2013.01); *C09D 7/40* (2018.01); *C09D 163/00* (2013.01); *C08K 3/013* (2018.01); *C08K 3/30* (2013.01); *C08K 2003/3045* (2013.01); *Y10T 428/31511* (2015.04); *Y10T 428/31529* (2015.04)

(58) Field of Classification Search
CPC .......... C09D 163/04; C09D 5/00; C09D 5/16; C09D 163/00; C09D 5/1693; C09D 5/08; C09D 7/40; B32B 15/08; B32B 13/042; B32B 13/02; B63H 1/28; B05D 7/14; B05D 7/544; B05D 7/546; C08G 59/50; C08G 59/5033; C08L 63/00; C08L 63/04; Y10T 428/31511; Y10T 428/31529; C08K 3/30; C08K 2003/3045; C08K 3/013
USPC ......................................................... 428/418
See application file for complete search history.

(56) References Cited

U.S. PATENT DOCUMENTS

| | | | | |
|---|---|---|---|---|
| 4,481,349 | A | * | 11/1984 | Marten ................... C08G 59/50 252/182.13 |
| 6,017,588 | A | | 1/2000 | Watanabe et al. |
| 6,451,437 | B1 | | 9/2002 | Amidaiji et al. |
| 6,723,439 | B2 | | 4/2004 | Amidaiji et al. |
| 2005/0129962 | A1 | | 6/2005 | Amidaiji et al. |

(Continued)

FOREIGN PATENT DOCUMENTS

| | | |
|---|---|---|
| CN | 101001929 A | 7/2007 |
| CN | 101351514 A | 1/2009 |

(Continued)

OTHER PUBLICATIONS

Combined Chinese Office Action and Search Report dated Mar. 2, 2017 in Chinese Patent Application No. 201480007248.9 (with English translation of categories of cited documents).

(Continued)

*Primary Examiner* — David T Karst
(74) *Attorney, Agent, or Firm* — Oblon, McClelland, Maier & Neustadt, L.L.P.

(57) ABSTRACT

Provided is a two-component-type primer having good adhesive property with a base material, particularly a non-ferrous metal, and excellent curability, without containing any chromium compound. The two-component-type primer comprises an epoxy resin, an MXDA (meta-xylenediamine) Mannich modified curing agent, a gypsum (excluding crystal gypsum), and a pigment (excluding gypsum), wherein the volume concentration of a gypsum and a pigment in a dry coating film formed with the primer is 40 to 50%.

20 Claims, No Drawings

(56) References Cited

U.S. PATENT DOCUMENTS

| | | | | |
|---|---|---|---|---|
| 2007/0213426 | A1* | 9/2007 | Abou-Nemeh | A01N 59/16 523/122 |
| 2009/0042036 | A1* | 2/2009 | Kato | C08G 59/184 428/413 |
| 2009/0123758 | A1* | 5/2009 | Amidaiji | C09D 5/08 428/413 |
| 2009/0226729 | A1 | 9/2009 | Niimoto et al. | |
| 2010/0209381 | A1* | 8/2010 | Tanaka | A01N 59/20 424/78.09 |
| 2010/0294676 | A1* | 11/2010 | Grun | C04B 26/06 206/223 |

FOREIGN PATENT DOCUMENTS

| | | |
|---|---|---|
| CN | 101492586 A | 7/2009 |
| JP | 53-63438 A | 6/1978 |
| JP | 2-263878 A | 10/1990 |
| JP | 08-231886 A | 9/1996 |
| JP | 10-339040 A | 12/1998 |
| JP | 2000-044653 A | 2/2000 |
| JP | 2001-139816 A | 5/2001 |
| JP | 2001-181509 A | 7/2001 |
| JP | 2002-080564 A | 3/2002 |
| JP | 2002-97407 A | 4/2002 |
| JP | 2002-167548 A | 6/2002 |
| JP | 2003-096266 A | 4/2003 |
| JP | 2006-206675 A | 8/2006 |
| JP | 2008-144020 A | 6/2008 |
| JP | 2010-24408 A | 2/2010 |
| JP | 2013-014868 A | 1/2013 |

OTHER PUBLICATIONS

Office Action dated Jul. 19, 2016 in Japanese Patent Application No. 2013-019513.
International Search Report dated May 13, 2014 in PCT/JP2014/052306 filed Jan. 31, 2014.
Combined Chinese Office Action and Search Report dated Jul. 5, 2016 in Patent Application No. 201480007248.9 (with English translation of the Office Action and categories of cited documents).

* cited by examiner

TWO-COMPONENT-TYPE PRIMER, PRIMER COATING FILM, LAYERED ANTIFOULING COATING FILM, AND METHOD FOR PREVENTING BASE MATERIAL FROM BEING FOULED

FIELD OF THE INVENTION

The present invention relates to a two-component-type primer, a primer coating film, a layered antifouling coating film, and a method for preventing a base material from being fouled, and particularly to a two-component-type primer, a primer coating film, a layered antifouling coating film, and a fouling prevention method, useful for a nonferrous metal surface.

DESCRIPTION OF THE RELATED ART

Most of the materials of ship propellers (hereinafter simply referred to as "propellers") are copper compounds such as brass. There have been problems such as reduction in propulsive power by propellers and corrosion by sea water components due to exposure of the surfaces of the nonferrous metals in sea water for a long period to allow various aquatic organisms such as animals such as oyster, mussel, and barnacle, plants such as laver, and bacterias to adhere to the surfaces and to propagate.

An antifouling coating has been applied onto a propeller surface to form an antifouling coating film in order to prevent adherence, propagation, and the like of the various aquatic organisms; however, a copper compound such as brass is an alloy with low surface activity, and it has been difficult to allow the antifouling coating film to firmly adhere to the propeller. Thus, in order to enhance adhesive property between the propeller and the antifouling coating film, a primer layer is usually disposed between both.

It is also necessary for the primer layer to endure high shearing force applied to a high-speed rotating propeller, and as a coating for forming such a primer layer, currently, an etching primer in which vinyl butyral resin is used as a binder, a chromium compound (zinc chromate) and phosphoric acid are employed, and adhesive property is secured by oxidation of zinc chromate has been often used. However, the influence (carcinogenicity) of zinc chromate on the human body has been perceived as a problem, and development of a chromium compound (zinc chromate)-free coating has been desired.

Against the problem, the present applicant has reported that use of a primer composition comprising an epoxy resin and a curing agent enables the formation of a primer coating film capable of allowing an antifouling coating film to firmly adhere to a propeller and the prevention of a propeller surface from being fouled for a long period (Patent Literature 1).

CITATION LIST

Patent Literature

[Patent Literature 1] JP-A-2008-144020

SUMMARY OF INVENTION

Technical Problem

However, there are cases when the primer coating film described in the patent literature has been unable to exhibit sufficient adhesive property with a nonferrous metal and a propeller.

The present invention was accomplished with respect to the problem, and an object of the present invention is to provide a two-component-type primer having good adhesive property with a base material, particularly a nonferrous metal and a propeller, and excellent curability, without containing any chromium compound.

Technical Solution

Under such circumstances, as a result of extensive examination for solving the problem, the present inventors found that the object can be achieved by a two-component-type primer comprising an epoxy resin, a specified curing agent, and a specified amount of a gypsum and a pigment, and the present invention was thus accomplished.

Configuration examples of the present invention are as follows:

[1] A two-component-type primer comprising an epoxy resin, an MXDA (meta-xylenediamine) Mannich modified curing agent, a gypsum (excluding crystal gypsum), and a pigment (excluding gypsum), wherein the volume concentration of a gypsum and a pigment in a dry coating film formed with the primer is 40 to 50%.

[2] The two-component-type primer according to [1], wherein the two-component-type primer comprises a bisphenol-type epoxy resin as the epoxy resin.

[3] The two-component-type primer according to [2], wherein the two-component-type primer further comprises a novolac-type epoxy resin as the epoxy resin.

[4] The two-component-type primer according to any of [1] to [3], wherein a reaction ratio between the epoxy resin and the curing agent is 0.5 to 1.0.

[5] The two-component-type primer according to any of [1] to [4], wherein the content of the gypsum is 5 to 300 parts by weight based on 100 parts by weight of the epoxy resin.

[6] The two-component-type primer according to any of [1] to [5], further comprising a curing accelerator.

[7] The two-component-type primer according to any of [1] to [6], further comprising a petroleum resin.

[8] The two-component-type primer according to any of [1] to [7], for use in a nonferrous metal.

[9] The two-component-type primer according to any of [1] to [8], for use in a ship propeller.

[10] A primer coating film (P) formed with the two-component-type primer according to any of [1] to [9].

[11] A layered antifouling coating film comprising the primer coating film (P) according to [10] and an antifouling coating film (Q) formed on a surface of the primer coating film

[12] The layered antifouling coating film according to [11], wherein the antifouling coating film (Q) is a coating film formed with a silicone resin-containing composition.

[13] A method for preventing a base material from being fouled, comprising covering a surface of a base material with the layered antifouling coating film according to [11] or [12] in order of the base material, the primer coating film (P), and the antifouling coating film (Q).

[14] The method for preventing a base material from being fouled, according to [13], wherein the base material is a nonferrous metal.

[15] The method for preventing a base material from being fouled, according to [13] or [14], wherein the base material is a ship propeller.

Advantageous Effects of Invention

The two-component-type primer of the present invention enables formation of a chromium compound-free primer coating film having excellent curability, quickly expressed practical strength, good adhesive property with a base material, particularly a nonferrous metal and a propeller, and, in addition, good adhesive property with a top coating film.

In accordance with the present invention, there can be provided a layered antifouling coating film excellent in adhesive property with a base material, particularly a nonferrous metal surface, strength, long-term anticorrosion properties, long-term antifouling properties, and the like in good balance.

DETAILED DESCRIPTION OF THE PREFERRED EMBODIMENTS

« Two-Component-Type Primer»

The two-component-type primer of the present invention (hereinafter also simply referred to as a "primer") comprises an epoxy resin, an MXDA Mannich modified curing agent, a gypsum (excluding crystal gypsum, hereinafter the same applies), and a pigment (excluding gypsum, hereinafter the same applies), wherein the volume concentration (hereinafter also referred to as "PVC") of a gypsum and a pigment in a dry coating film formed with the primer is 40 to 50%.

Such a primer enables formation of a chromium compound-free primer coating film having excellent curability, quickly expressed practical strength, good adhesive property with a base material, particularly a nonferrous metal surface and a propeller, and, in addition, good adhesive property with a top coating film.

A propeller easily suffers damage by waste refuse rolled up in the sea and cavitation due to bubbles generated by high-speed rotation of the propeller, and a primer coating film formed on the propeller requires high adhesive property, coating film strength, and shock resistance (cavitation resistance). The primer also requires the ability of being cured immediately after coating and of forming a coating film with quickly expressed practical strength. The obtained primer coating film desirably has good adhesive property with a silicone coating film which is often overcoated for antifouling properties, cavitation resistance, and the like.

The primer of the present invention is a primer that sufficiently satisfies the requirements. The primer enables the formation of the primer coating film that sufficiently satisfies the requirements.

The primer of the present invention enables formation of a primer coating film having excellent anticorrosion properties even when containing no chromium compound since the primer comprises a gypsum, a pigment, and the like. Therefore, the primer excellent in coating safety and environmental safety can be obtained.

In consideration of the above descriptions and the like, the primer of the present invention can be preferably used as a primer for coating a nonferrous metal, particularly a propeller.

<Epoxy Resin>

The epoxy resin is preferred because of exhibiting high adhesive strength to a base material with which the epoxy resin is brought into contact, of being excellent in mechanical properties and the like, and of being easily cured by using a curing agent mentioned below.

Such epoxy resins may be used singly or in combination of two or more kinds.

The epoxy resin is not particularly limited without spoiling advantages offered by the present invention. Examples of the epoxy resin include bisphenol type epoxy resins, glycidyl ester epoxy resins, glycidyl amine epoxy resins, novolac type epoxy resins (e.g., phenol novolac type epoxy resins, cresol novolac type epoxy resins), dimer acid modified epoxy resins, aliphatic epoxy resins, alicyclic epoxy resins, epoxidized oil-based epoxy resins, and the like.

Of these, bisphenol A type epoxy resins, bisphenol F type epoxy resins, and novolac type epoxy resins for general purpose use are preferred in view of excellent adhesive force to a base material, excellent corrosion resistance, and the like.

In addition, the bisphenol A type and F type epoxy resins are preferably semisolid at 25° C., e.g., since curability can be improved to immediately obtain a coating film having practical strength. Further, it is particularly desirable to use the bisphenol A type or F type epoxy resins in combination with a novolac type epoxy resin rather than alone, e.g., since a coating film of which the coating film strength (hardness) is not too high and which has sufficient strength when used in a propeller and/or the like is obtained.

The epoxy resin that is semisolid at 25° C. refers to a highly viscous epoxy resin having a viscosity of preferably 1000 centipoises or more, more preferably 10000 centipoises or more, at 25° C. at NV of 100%.

Examples of the epoxy resin that is liquid at ordinary temperature (5 to 35° C., JIS Z 8703, hereinafter the same applies) include "EPOTOHTO YD-128" (trade name) (manufactured by NIPPON STEEL & SUMITOMO METAL CORPORATION, epoxy equivalent weight of 184 to 194, viscosity of 1.2000 to 15000 cPs/25° C.), "jER828" (trade name) (manufactured by Mitsubishi Chemical Corporation, epoxy equivalent weight of 180 to 190, viscosity of 12000 to 15000 cPs/25° C.), "EPOTOHTO YDF-170" (trade name) (manufactured by NIPPON STEEL & SUMITOMO METAL CORPORATION, epoxy equivalent weight of 160 to 180, viscosity of 2000 to 5000 cPs/25° C.), "FLEP 60" (trade name) (manufactured by Toray Thiokol Co., Ltd., epoxy equivalent weight of about 280, viscosity of about 17000 cPs/25° C.), and the like.

Examples of the epoxy resin that is semisolid at ordinary temperature include "E-834-85X (T)" (trade name) (manufactured by OHTAKE MEISHIN CHEMICAL, CO., LTD., epoxy equivalent weight of 230 to 270), "jER834" (trade name) (manufactured by Mitsubishi Chemical Corporation, epoxy equivalent weight of 230 to 270), "EPOTOHTO YD134" (trade name) (manufactured by NIPPON STEEL & SUMITOMO METAL CORPORATION, epoxy equivalent weight of 230 to 270), "EPOTOHTO YD-172" (trade name) (manufactured by NIPPON STEEL & SUMITOMO METAL CORPORATION, epoxy equivalent weight of 600 to 700), "EPICLON-5300-70" (trade name) (manufactured by DIC Corporation, epoxy equivalent weight of 450 to 500), and the like.

Examples of the epoxy resin that is solid at ordinary temperature include "jER1000-75X" (trade name) (manufactured by Mitsubishi Chemical Corporation, epoxy equivalent weight of 450 to 500) and the like.

The epoxy resin preferably has an epoxy equivalent weight of 160 to 700, more preferably 160 to 500, and preferably has a viscosity of 500 to 20000 cPs/25° C., more preferably 500 to 18000 cPs/25° C.

The epoxy equivalent weight and viscosity of the epoxy resin in the above ranges are preferred because of offering good workability in coating of a primer. The epoxy equivalent weight and viscosity of the epoxy resin in the above ranges are also preferred since a primer coating film having excellent strength and excellent adhesive force to a base material (particularly, a nonferrous metal) can be obtained.

Based on 100 parts by weight of a solid (non-volatile component) in the two-component-type primer, preferably 0.1 to parts by weight, more preferably 5 to 50 parts by weight, further preferably 10 to 30 parts by weight, of the epoxy resin is desirably contained. The amount of the blended epoxy resin in the above range is preferred since a primer having excellent coating workability and the excellent leveling properties of a coating film is obtained, and a primer coating film having good adhesive property with a base material, particularly a nonferrous metal, toughness, and flexibility is obtained.

When the two or more epoxy resins are used, the amounts of the epoxy resins used are also preferably in the above ranges.

Further, when (i) a bisphenol A type or F type epoxy resin and (ii) a novolac type epoxy resin are used in combination as described above, a use rate thereof ((i):(ii)) is, by mass ratio, preferably 300:100 to 100:300, more preferably 200:100 to 100:200, further preferably 150:100 to 100:150, e.g., since a coating film of which the coating film strength (hardness) is not too high and which has sufficient strength when used in a propeller and/or the like is obtained.

<MXDA Mannich Modified Curing Agent>

The curing agent is not particularly limited if being a MXDA Mannich modified curing agent. For example, the curing agent is preferably a Mannich modified amine obtained by Mannich condensation of a phenol, an aldehyde, and meta-xylenediamine.

Use of the curing agent in the primer of the present invention is preferred since a primer excellent in a curing rate, particularly low-temperature (5 degrees Celsius centigrade or less) curability, is obtained, and a primer coating film excellent in adhesive property with a base material, particularly a nonferrous metal, strength, and the like in good balance is obtained.

In particular, since meta-xylenediamine is a raw material of the curing agent, a primer having excellent curability is obtained, and a primer coating film having excellent coating film strength is obtained.

The curing agent may be used alone or in combination of two or more kinds.

A coating film formed on a propeller surface is usually formed by being naturally dried without being force-dried by heating after having been coated. The obtained propeller is often used without much delay after the coating in view of workability, a cost, and the like. In the case of using the propeller immediately after the coating in such a manner, it is necessary that the coating film formed on the propeller surface is a coating film having excellent curability in an early period after coating and high early strength since the propeller suffers strong stream and/or cavitation due to rotation. Since such a coating film can be formed, an MXDA Mannich modified amine is preferred.

Examples of the phenol include unsaturated substituent-containing phenols, saturated substituent-containing phenols, and the like. Such phenols may be used singly or in combination of two or more kinds.

Examples of the unsaturated substituent-containing phenols include a phenol which contains at least one monohydroxyphenyl group in the molecule and in which some of hydrogen atoms in the phenyl group, i.e., one to five of the hydrogen atoms are substituted by an unsaturated hydrocarbon group; and the like.

Examples of the unsaturated hydrocarbon group include alkylene groups having 1 to 30 carbon atoms and phenyl groups containing alkylene groups having 1 to 30 carbon atoms.

Specific examples of such unsaturated substituent-containing phenols include cardanol, isopropenyl phenol, diisopropenyl phenol, butenyl phenol, isobutenyl phenol, cyclohexenyl phenol, monostyrenated phenol ($C_5H_5$—CH=CH—$C_6H_4$—OH), and distyrenated phenol (($C_6H_5$—CH=CH)$_2$—$C_6H_3$—OH).

The saturated substituent-containing phenols may also be monohydroxylic or polyhydroxylic, and mononuclear or polynuclear. Specific examples of the saturated substituent-containing phenols include phenol which is monohydroxylic mononuclear phenols; resorcinol, hydroquinone, and the like which are dihydroxylic mononuclear phenols; 1,5-dihydroxynaphthalene, 2,7-dihydroxynaphthalene, 2,6-dihydroxynaphthalene, and the like which are dihydroxylic polynuclear phenols; alkylphenols (the number of carbon atoms in the alkyl group: 1 to 10, preferably 1 to 5); halogenated phenols, alkoxyphenols (the number of carbon atoms in the alkoxy group: 1 to 10, preferably 1 to 5); bisphenol A; and bisphenol F.

Specific examples of the alkylphenols include monohydroxylic phenols such as methylphenol (o-, m-, p-cresol), ethylphenol, butylphenol, tert-butylphenol, octylphenol, nonylphenol, dodecylphenol, and dinonylphenol. Specific examples of the halogenated phenols include monohydroxylic phenols such as chlorophenol. Specific examples of the alkoxyphenols include methoxyphenol and the like.

Of the saturated substituent-containing phenols, monohydroxylic mononuclear phenols are preferable.

Examples of the aldehyde include formaldehyde, paraformaldehyde, acetaldehyde, and the like. Such aldehydes may be used singly or in combination of two or more kinds.

In the Mannich condensation, for example, a phenol such as cardanol, an aldehyde, and meta-xylenediamine may be used in an equivalent moles theoretically; usually, based on 1 mol of the phenol, the aldehyde is used in an amount of 0.5 to 2.5 mol and meta-xylenediamine is used in an amount of 0.5 to 2.5 mol, and they may be heated at a temperature of around 50 to 180° C. for around 3 to 1.2 hours. After the reaction, the reaction product may be heated under reduced pressure to remove moisture and an unreacted material.

Of the MXDA Mannich modified curing agents obtained by subjecting the phenol, the aldehyde, and meta-xylenediamine as described above to Mannich condensation reaction, preferred is a Mannich modified amine obtained by allowing cardanol which is the unsaturated substituent-containing phenol, formaldehyde, and meta-xylenediamine to react.

The curing agent is preferably poorly soluble or insoluble in water. When the curing agent is easily dissolved in water, it may be difficult to apply the obtained primer to a wet surface.

The curing agent desirably has an amine number (mg-KOH/g) in a range of preferably 100 to 500, more preferably 200 to 500, and desirably has an active hydrogen equivalent weight in a range of preferably 50 to 500, more preferably 80 to 400, e.g., since a primer having excellent curability is obtained and a primer coating film excellent in coating film strength and adhesive property with a base material, particularly a nonferrous metal, in good balance is obtained.

Specific examples of the curing agent include LUCKAMIDE V6-221 (MXDA Mannich modified amine, liquid, NV of 100%, amine number of 420) manufactured by DIC Corporation; MAD 204 (A) (MXDA Mannich modified amine, solid, NV of 65%, amine number of 250) manufactured by OHTAKE MEISHIN CHEMICAL, CO., LTD.; and the like.

The viscosity of the curing agent as controlled to NV of usually 50 to 100% is preferably measured by an E type viscometer to be 100 to 100000 cPs/25° C., more preferably 500 to 10000 cPs/25° C., depending on, e.g., the conditions of coating and curing the obtained primer and not unconditionally determined, e.g., since the primer excellent in handleability and coating properties is obtained.

For example, since the early curability of the obtained primer is improved by using a curing agent (I) that is solid at 25° C. and a primer coating film having high early strength is obtained by using a curing agent (II) that is liquid at 25° C., it is desirable to use both curing agents (I) and (II) in combination as the curing agent.

The ratio between the amounts of the curing agents (I) and (II) used ((I):(II), mass ratio (non-volatile component)) is preferably 100:0.1 to 0.1:100, more preferably 100:10 to 10:100.

When the ratio between the amounts of the curing agents (I) and (II) used is in the above range, a primer having desired curability can be obtained, and a primer coating film having desired strength can be formed.

When the amount of the curing agent (II) used is increased over the range, an obtained primer coating film may be excessively hardened and may have poor durability.

The primer of the present invention preferably includes the epoxy resin and the curing agent in such amounts that a reaction ratio thereof is preferably 5 to 1.0, more preferably 0.8 to 1.0. The inclusion in such amounts is preferred since the primer having excellent curability is obtained, and a primer coating film excellent in coating film strength and adhesive property with a base material, particularly a non-ferrous metal, in good balance is obtained.

When the reaction ratio is less than 0.5, there is the tendency of deteriorating the curability of the primer and of causing the insufficient strength of the obtained coating film. When the reaction ratio is more than 1.0, an excessive amount of an unreacted curing agent is present in the obtained coating film, and adhesive property with a top coating film such as a silicone coating film may be inhibited by transfer of the curing agent to the surface of the coating film.

The reaction ratio is a value calculated by (epoxy resin solid weight/epoxy equivalent weight)/(amine curing agent solid weight/active hydrogen equivalent weight).

<Gypsum>

In general, crystal gypsum ($CaSO_4.2H_2O$), hemihydrate gypsum ($CaSO_4 0.5H_2O$), and anhydrous gypsum ($CaSO_4$) are known as gypsums. The gypsums to be used in the present invention are hemihydrate gypsum and/or anhydrous gypsum. The gypsums may be natural or artificial products. Further, the form thereof is not also particularly limited, but the gypsums are preferably powdery.

A primer coating film excellent in water resistance, salt water resistance, and anticorrosion properties can be obtained by incorporating the gypsum into the primer of the present invention.

Further, anhydrous gypsum and hemihydrate gypsum have the characteristics of solidifying when adsorbing moisture and of retaining moisture. Accordingly, since a coating film containing anhydrous gypsum or hemihydrate gypsum has the action of retaining moisture and relieving the internal stress of the coating film by a plasticity effect, the adhesive property of the coating film with a base material is considered to be improved.

Although use of the curing agent results in improved curability of the obtained primer and in shortened time until practical strength of the obtained coating film is obtained, finally provided coating film strength tends to excessively rise. In this case, it is considered that a balance between early coating film strength and the final coating film strength can be struck to secure adhesive property with the base material since the finally provided coating film strength is relieved by the action of the gypsum.

The hemihydrate gypsum is classified into α type and β type hemihydrate gypsums. The α type hemihydrate gypsum is preferred in view of the strength of the obtained coating film.

Examples of the hemihydrate gypsum include "FT-2" (average particle diameter of 15 μm) manufactured by NORITAKE CO., LIMITED.

Further, the anhydrous gypsum is classified into type I, type II, and type III anhydrous gypsums, but is not particularly limited thereto.

Examples of the anhydrous gypsum include "AS GYPSUM" manufactured by SAN ESU GYPSUM CO., LTD.

Based on 100 parts by weight of the epoxy resin, it is preferable to blend 5 to 300 parts by weight of the gypsum, and it is more preferable to blend 5 to 200 parts by weight of the gypsum, in view of, e.g., the adhesive property of the obtained coating film with a base material, without limitation in the case of containing the gypsum in the primer so that PVC in a dry coating film obtained from the primer of the present invention is in a range described below.

When the amount of the blended gypsum is less than 5 parts by weight, an expected stress relief action tends to be low. When the amount is more than 300 parts by weight, the obtained coating film tends to be easily cracked.

Such gypsums may be used singly or in combination of two or more kinds.

<Pigment>

The pigment is not particularly limited if being a pigment other than the gypsums. Examples of the pigment include extender pigments, coloring pigments, and rust preventive pigments. The pigment may be organic or inorganic.

The extender pigment is a pigment that has a low refractive index as well as is transparent and does not conceal a coating surface when kneaded with oil or varnish. Inclusion of the extender pigment in the primer of the present invention is preferred in view of improvement in the physical properties of a coating film, such as crack resistance.

Examples of the extender pigment include zinc oxide, talc, silica, mica, clay, potash feldspar, glass flake, calcium carbonate also used as an anti-settling agent, kaoline, alumina white, white carbon also used as a delustering agent, aluminum hydroxide, magnesium carbonate, barium carbonate, barium sulfate (e.g. baryta powder), and the like. Of these, a pigment selected from the group consisting of talc, silica, mica, clay, calcium carbonate, kaoline, barium sulfate, and potash feldspar is preferable.

Such extender pigments may be used singly or in combination of two or more kinds.

The primer of the present invention preferably contains a flat-shaped pigment such as mica or glass flake as the extender pigment in view of, e.g., the relief of the internal stress of an obtained coating film and the improvement in adhesive property with a base material. Mica is preferred as the flat-shaped pigment, e.g., because of being inexpensive, excellent in availability, and capable of forming a coating film superior in the effects.

Based on 100 parts by weight of the epoxy resin, the amount of the blended extender pigment is preferably 0.1 to 500 parts by weight, more preferably 50 to 400 parts by weight, without limitation in the case of containing the extender pigment in the primer so that PVC in a dry coating film obtained from the primer of the present invention is in a range described below.

Further, when the primer of the present invention is blended with the flat-shaped pigment, the amount of the blended flat-shaped pigment is preferably 0.1 to 300 parts by weight, more preferably 30 to 100 parts by weight, based on 100 parts by weight of the epoxy resin, in view of, e.g., providing a coating film excellent in adhesive property with a base material.

Various organic and inorganic pigments known in the art can be used as the coloring pigments.

Examples of the organic pigments include naphthol red, phthalocyanine blue, and the like. Examples of the inorganic pigments include carbon black, bengala, titanium white, yellow iron oxide, and aluminum powder.

Such coloring pigments may be used singly or in combination of two or more kinds.

Inclusion of the coloring pigment in the primer of the present invention is preferred since the hue of the obtained primer coating film can be optionally regulated.

For example, in the case of applying the primer of the present invention onto a copper base material, use of aluminum (powder), titanium white, or yellow iron oxide as the coloring pigment is preferred in view of, e.g., enabling reduction in hue difference between the copper base material and the primer coating film.

Based on 100 parts by weight of the epoxy resin, the amount of the blended coloring pigment is preferably 0.01 to 200 parts by weight, more preferably 0.01 to 100 parts by weight, without limitation in the case of containing the coloring pigment in the primer so that PVC in a dry coating film obtained from the primer of the present invention is in a range described below.

Examples of the rust preventive pigments include pigments of molybdic acid type, phosphoric acid type, boric acid type, ferrite type, and plumbic acid type and the like.

The pigment is desirably blended in the primer, in such an amount that PVC in the dry coating film obtained from the primer of the present invention is 40 to 50%, preferably 43 to 50%, more preferably 45 to 50%.

The PVC is strongly related to the internal stress of the dry coating film. Excessively low PVC tends to result in the increased internal stress of the dry coating film, in deteriorated adhesive property of the dry coating film with a nonferrous metal, particularly a propeller (brass), and in the generation of detachment and a blister. Further, excessively high PVC tends to result in the deterioration of the film-formation properties of the dry coating film and in cracking. In the primer of the present invention, PVC is preferably in the above range in view of both security of adhesive property and prevention of a blister and a crack.

PVC of more than 40% often result in occurrence of such problems that the coating film becomes porous and rust is formed when the base material is iron. Composition with PVC of more than 40% is not usually employed in a priming paint for a steel material.

<Optional Component>

The primer may further contain a curing accelerator; a petroleum resin (plasticizer); a pigment dispersing agent; ananti-sagging agent; an anti-settling agent; a solvent; a reactive diluent; an adhesion potentiator such as a silane coupling agent; a thermoplastic resin (excluding petroleum resins); a curing agent such as a ketimine or an aromatic polyamine; an inorganic dehydrating agent (stabilizer); an antifoulant; cement; a fibrous filler such as a rock wool or a glass fiber; another coating film formation component; a dye; and the like, other than the epoxy resins, the curing agents, the gypsums, and the pigments, in such ranges that advantages offered by the present invention are not spoiled.

Each of the optional components may be used singly or in combination of two or more kinds.

<Curing Accelerator>

The primer of the present invention preferably contains a curing accelerator in order to further improve the curing rate and low-temperature curability of the obtained primer.

The curing accelerator may be a curing accelerator used in a coating and known in the art and is preferably a tertiary amine, an acrylic acid ester, or the like in view of providing a primer excellent in curing rate and low-temperature (5 degrees Celsius centigrade or less) curability.

Examples of the tertiary amine include, but are not limited to, triethanolamine, dialkylaminoethanol $\{[CH_3(CH_2)_n]_2NCH_2CH_2OH\}$, triethylenediamine (1,4-diazacyclo(2,2,2)octane), 2,4,6-tri(dimethylaminomethyl)phenol (e.g., "VERSAMINE EH30" (trade name) manufactured by BASF Japan Ltd., "ANCAMINE K-54" (trade name) manufactured by Air Products and Chemicals, Inc.), and the like. Of these, 2,4,6-tri(dimethylaminomethyl)phenol is preferable.

As the acrylic acid ester, a polyfunctional acrylic acid ester is preferable without limitation. Examples of comercially available products thereof include a polyfunctional acryl ester ("M-CURE 400" (trade name) manufactured by Sartomer Company).

The curing accelerator is preferably blended in an amount of 0.01 to 80 parts by weight, more preferably 0.01 to 50 parts by weight, based on 100 parts by weight of the epoxy resin.

The amount of the blended curing accelerator in the above range is preferred since the curing rate and low-temperature curability of the obtained primer is further improved.

<Petroleum Resin>

The primer of the present invention preferably contains a petroleum resin in view of, e.g., the action of relieving the internal stress of the obtained coating film and improvement in adhesive property with the base material.

Further, the inclusion of the petroleum resin in the primer of the present invention enables easy adjustment of the viscosity of the primer and easy adjustment of the strength of the obtained coating film.

Examples of the petroleum resin include, but are not limited to, a polymer based on a fraction that is produced as a by-product by petroleum refining. Specific examples of the petroleum resin include an aromatic petroleum resin obtained by polymerizing a $C_9$ fraction such as styrene derivative, indene, or vinyltoluene from a heavy oil that is produced as a by-product by decomposition of petroleum naphtha; an aliphatic petroleum resin obtained by polymerizing a $C_5$ fraction such as 1,3-pentadiene or isoprene; a copolymer-based petroleum resin obtained by copolymerizing the $C_9$ fraction and the $C_5$ fraction; an aliphatic petroleum resin obtained by cyclic-polymerizing a part of a conjugated diene of a $C_5$ fraction such as cyclopentadiene or 1,3-pentadiene; resins obtained by hydrogenating the petroleum resins; an alicyclic petroleum resin obtained by polymerizing dicyclopentadiene; and the like.

Of these, the resin obtained by polymerizing the $C_9$ fraction is preferred because of having excellent compatibility with the epoxy resin and the curing agent.

The petroleum resin is preferably blended in an amount of 0.1 to 100 parts by weight, more preferably 0.1 to 50 parts by weight, based on 100 parts by weight of the epoxy resin.

The amount of the blended petroleum resin in the above range is preferred since the adhesive property of the obtained coating film with a base material is further improved.

<Pigment Dispersing Agent>

As the pigment dispersing agent, various organic and inorganic dispersing agents known in the art can be used. Examples of the organic-based pigment dispersing agents include aliphatic amines or organic acids ("DUOMEEN TDO" manufactured by Lion Corporation, "DISPERBYK BKY 101" manufactured by BYK-Chemie GmbH), and the like.

The pigment dispersing agent is desirably blended in an amount of preferably 0.01 to 100 parts by weight, further preferably 0.01 to 50 parts by weight, based on 100 parts by weight of the epoxy resin.

<Anti-Sagging Agent>

Examples of the anti-sagging agent include amide wax-based compounds, hydrogenated castor oil wax-based compounds, polyamide wax-based compounds, inorganic bentonite-based compounds, synthetic pulverizing silica, and mixtures thereof. Polyamide wax and synthetic pulverizing silica are preferable.

Examples of commercially available products thereof include "DISPARLON 6650" and "DISPARLON A630-20XC" manufactured by Kusumoto Chemicals, Ltd.; "ASAT-250F" manufactured by Itoh Oil Chemicals Co., Ltd.; and the like.

Inclusion of the anti-sagging agent in the primer of the present invention is preferred, e.g., since sagging prevention properties in coating and the like can be adjusted.

The amount of the blended anti-sagging agent is preferably 0.1 to 100 parts by weight, more preferably 0.1 to 50 parts by weight, based on 100 parts by weight of the epoxy resin.

<Anti-Settling Agent>

Examples of the anti-settling agent include an organoclay-based Al, an amine salt of Ca or Zn, a polyethylene wax, an oxidized polyethylene-based wax, and the like. Oxidized polyethylene-based wax is preferable.

Examples of commercially available products thereof include "DISPARLON 4200-20X" manufactured by Kusumoto Chemicals, Ltd.; and the like.

Inclusion of the anti-settling agent in the primer of the present invention is preferred since precipitation which can occur during storage of the primer containing solvent insoluble matter can be reduced to improve the stirring properties of the primer.

The amount of the blended anti-settling agent is preferably 0.1 to 100 parts by weight, more preferably 0.1 to 50 parts by weight, based on 100 parts by weight of the epoxy resin.

<Solvent>

The primer of the present invention can contain the solvent.

As the solvent, solvents with a wide boiling point range known in the art can be used. Specific examples of such solvents include solvents such as aliphatic solvents such as turpentine; aromatic solvents such as toluene and xylene; alcohol-based solvents such as isopropyl alcohol, n-butyl alcohol, and isobutyl alcohol; ester-based solvents such as ethyl acetate and butyl acetate; ketone-based solvents such as methyl ethyl ketone, methyl isobutyl ketone, and methyl amyl ketone; and ether- or ether ester-based solvents such as ethylene glycol monomethyl ether, ethylene glycol monobutyl ether, propylene glycol monomethyl ether, and propylene glycol monomethyl ether acetate. Preferred examples thereof include xylene, n-butyl alcohol, methyl isobutyl ketone, and propylene glycol monomethyl ether.

In the primer of the present invention, the solvent is usually blended in an amount of preferably 0.1 to 80 parts by weight, more preferably 0.1 to 50 parts by weight, without limitation, in consideration of coating properties and the like.

When commercially available products are used as the epoxy resin and the curing agent, the amount of the above blended solvent is the total weight of the components excluding solvents (diluents) that may be contained in the commercially available products.

<Silane Coupling Agent>

The primer of the present invention preferably contains the silane coupling agent since use of the silane coupling agent enables not only further improvement in the adhesive property of the obtained coating film with a base material but also improvement in the anticorrosion properties of the obtained coating film.

As the silane coupling agent, silane coupling agents known in the art can be used without limitation. The silane coupling agent is preferably a compound that has at least two functional groups in the same molecule and can contribute to, e.g., improvement in adhesive property with a base material and decrease in the viscosity of the primer, more preferably a compound represented by Formula: X—S(OR)$_3$ [X represents a functional group that can react with an organic substance (e.g., an amino group, a vinyl group, an epoxy group, a mercapto group, and a halo group, or hydrocarbon groups containing the groups; an ether bond and/or the like may be present in the hydrocarbon groups) or an alkyl group; and OR represents a hydrolyzable group (e.g., a methoxy group and an ethoxy group)].

Specific examples of preferred silane coupling agents include "KBM-403" (γ-glycidoxypropyltrimethoxysilane, manufactured by Shin-Etsu Chemical Co., Ltd.); "SILA-ACE S-510" (manufactured by JNC CORPORATION); and the like.

The amount of the blended silane coupling agent is preferably 0.1 to 10 parts by weight, more preferably 0.3 to 5 parts by weight, based on 100 parts by weight of the primer of the present invention. Use of the primer containing such an amount of the silane coupling agent results in improvement in coating workability since adhesive property with a base material and the like are improved, and the viscosity of the primer of the present invention can be decreased.

<Two-Component-Type Primer>

The primer of the present invention is excellent in storage stability, storage easiness, and the like because of being of two-component type.

The primer of the present invention is preferably a two-liquid-type primer in view of the formability of the coating film, the excellent physical properties of the obtained coating film, and the like.

The primer of the present invention is preferably a two-component-type primer comprising a base agent component containing the epoxy resin and a curing agent component containing the curing agent.

The gypsum and the pigment may be contained in either base agent component or curing agent component, or both thereof. Each of the gypsum and the pigment may also be contained in the separate components. The inclusion of both gypsum and pigment in the base agent component is preferred since the primer is obtained, which is excellent in the easiness of its production, the easiness of kneading and stirring the two components for use, the easiness of coating, storage stability, and the like.

Further, the primer having PVC in the specified range can be prepared, e.g., in such a manner as described below.

(1) Based on 100 g of the overall primer, the amount (g) of the blended epoxy resin is set, and the amount (gi of the blended curing agent is determined depending thereon.

(2) The kind of the pigment to be blended is determined, and the amounts (g) of the gypsum and the pigment blended are determined, depending on PVC (40 to 50%), from the densities of the gypsum and the pigment, the densities of the epoxy resin and the curing agent, and the amounts of the epoxy resin and the curing agent blended.

The base agent component and the curing agent component can be produced respectively by stirring, mixing, and the like of the components to be blended into each of the base agent component and the curing agent component. The primer of the present invention can be produced by stirring, mixing, and the like of the base agent component and the curing agent component that have been pre-prepared.

For the stirring and the mixing, a mixing apparatus and a stirring apparatus known in the art, such as a paint shaker, a high-speed disperser, a sand grind mill, a basket mill, a ball mill, a triple roll mill, a Ross mixer, and a planetary mixer, may be used.

« Primer Coating Film (P)»

The primer coating film (P) of the present invention is not particularly limited if being a coating film obtained from the primer, but is preferably a coating film obtained by coating the primer on a base material, and dries and curing the primer.

The primer coating film (P) is excellent in strength, adhesive property with a base material, particularly a nonferrous metal surface, long-term anticorrosion properties, and the like in good balance, and is also excellent in adhesive property with an antifouling coating film (Q) described below, because of being formed with the primer of the present invention.

Further, the primer of the present invention enables easy formation of a desired coating film at low temperature in a short time because of having excellent drying properties and being able to be cured at low temperature.

<Base Material>

Examples of the base material include, but are not limited to, base materials comprising nonferrous metals, stainless steel, plating-treated metals, and the like. Since the primer of the present invention particularly exhibits good adhesive property and anticorrosion properties for a nonferrous metal, use of a nonferrous metal as the base material is preferred in view of the ability of more effectively exerting advantages offered by the present invention.

As used herein, the nonferrous metal refers to a metal other than steel materials.

Examples of the nonferrous metal include copper, copper alloys (e.g., bronze, aluminum bronze, nickel/aluminum bronze, manganese bronze, brass, copper zinc alloy, beryllium copper), aluminum, aluminum alloys, nickel alloys (e.g., nickel/chromium), and titanium alloys.

Specific examples of the base material include underwater structures, ships, fishing nets, fishing implements, and the like.

A ship propeller is made of, for example, a copper alloy such as a high strength brass casting (JIS CAC301) or an aluminum bronze cast (JIS CAC703); aluminum; stainless steel; or the like. Therefore, the primer of the present invention can exhibit the above characteristics as a primer for the ship propeller and can be preferably used in the ship propeller.

The base material is preferably a base material of which the surface is preferably pretreated by, e.g., a sand blasting method, a friction method, or a method of removing oil or dust by degreasing, for further improving adhesive property between the base material and the primer of the present invention.

A method for applying the primer is not particularly limited. As the method, a coating method known in the art can be employed.

The coated primer may be dried and cured, as desired, by heating or blast because of being excellent in drying properties and being able to be cured at low temperature. However, the coated primer is usually dried and cured under natural conditions.

The practical strength of the primer coating film (P) is appropriately selected depending on use. The primer coating film (P) preferably has a pencil hardness of 6B to 6H, more preferably 4B to 4H.

The primer coating film having such a hardness is preferred since the coating film can sufficiently endure actual use and has excellent durability.

The film thickness of the primer coating film (P), which may be appropriately adjusted depending on a desired application, is preferably 50 to 300 μm, more preferably 70 to 150 μm.

« Layered Antifouling Coating Film»

The layered antifouling coating film of the present invention includes the primer coating film (P) and an antifouling coating film (Q) formed on the surface of the primer coating film (P).

By the layered antifouling coating film of the present invention, a base material, particularly a nonferrous metal, and, in addition, a ship propeller can be prevented from being corroded and fouled for a long period.

Such a layered antifouling coating film is preferably formed on a base material. Specifically, it is preferable to form the layered antifouling coating film on the base material in order of the base material, the primer (P), and the antifouling coating film (Q). Examples of the base material include the same base materials as those exemplified in the section « Primer Coating Film (P)» .

The antifouling coating film (Q) is not particularly limited but may be any coating film known in the art and formed with a hydration decomposition type antifouling coating, a hydrolysis type antifouling coating, a silicon type antifouling coating, or the like. In view of, e.g., adhesive property with the primer coating film (P), the antifouling coating film (Q) is preferably a coating film formed with a silicone resin-containing composition.

In particular, when the layered antifouling coating film is formed on a propeller surface, the antifouling coating film (Q) may be a self-polishing type antifouling coating film containing an antifoulant; however, since wearing of the antifouling coating film (Q) is accelerated by high-speed rotation of the propeller, problems may occur in view of long-term antifouling properties. Accordingly, when the layered antifouling coating film is formed on the propeller surface, the antifouling coating film (Q) is preferably a coating film formed with the silicone resin-containing composition, exhibiting the long-term antifouling properties even if containing no antifoulant.

Examples of the silicone resin-containing composition include a composition containing organopolysiloxane having at least two condensation-reactive functional groups; and the like. More specifically, compositions that are described in JP-A-2001-139816, JP-A-2001-181509, and the like and are known in the art can be used.

Specifically, the silicone resin-containing composition is preferably a curable composition containing (A) organopolysiloxane having condensation-reactive functional groups at both ends of its molecule; and (B) hydrophobic silica, in which the hydrophobic silica (B) is heat-treated with the organopolysiloxane (A).

The organopolysiloxane (A) is preferably a compound represented by the following formula (a), e.g., in view of providing an antifouling coating film having excellent adhesive property with the primer coating film (P).

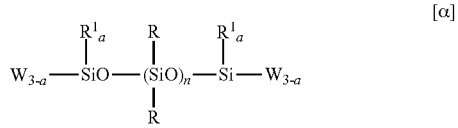 [α]

In the formula [α], W independently represents a hydroxyl or hydrolyzable group, $R^1$ and R each independently represent an unsubstituted or substituted monovalent hydrocarbon group having 1 to 12 carbon atoms, n represents an integer of 5 or more, and a represents zero (0), 1, or 2.

Further, the silicone resin-containing composition preferably contains the organopolysiloxane (A), the hydrophobic silica (B), and, in addition, organosilane (C) represented by the formula: $R^2{}_bSiX_{4-b}$ (wherein $R^2$ represents an unsubstituted or substituted monovalent hydrocarbon group having 1 to 8 carbon atoms; X represents a hydrolyzable group; and b represents zero (0) or 1) or a partially hydrolyzed product thereof, when W is a hydroxyl group and a is 2 in the formula [α].

Examples of the silicone resin-containing composition include "BIOCLEAN DX" (trade name) manufactured by CHUGOKU MARINE PAINTS, LTD.; and the like.

The antifouling coating film (Q) may be formed, for example, by drying and curing a composition capable of forming the antifouling coating film (Q), as desired, by heating or blast. However, the antifouling coating film (Q) can be usually formed by drying and curing the composition under natural conditions.

The film thickness of the antifouling coating film (Q), which may be appropriately adjusted depending on a desired application, is preferably 50 to 300 μm, more preferably 70 to 150 μm.

« Method for Preventing Base Material from being Fouled »

The method for preventing a base material from being fouled according to the present invention comprises covering the surface of a base material with the layered antifouling coating film of the present invention in order of the base material, the primer coating film (P), and the antifouling coating film (Q).

By such a fouling prevention method, aquatic organisms such as sea lettuce, barnacle, green string lettuce, serpula, oyster, and bryozoan can be expected to be prevented from adhering to the surface of the base material, particularly the surface of a nonferrous metal, for a long term.

The fouling prevention method can be conducted specifically by coating the surface of a base material with the primer, as needed, drying and curing the primer, followed by coating, drying, and curing the composition capable of forming the antifouling coating film (Q).

The base material and the drying and the curing conditions may be similar to the base material and the drying and the curing conditions exemplified in the section <<Primer Coating Film (P)>>.

EXAMPLES

The present invention will be more specifically described below referring to examples, but the present invention is not limited to the examples described below. Unless otherwise specified, "part(s)" in the examples and comparative examples described below refers to part(s) by weight.

Raw materials used in the examples and comparative examples described below are listed in Table 1 below.

TABLE 1

| Kind | Product name | Manufacturer | Substance | Remarks | Heating residue |
|---|---|---|---|---|---|
| Epoxy resin | EPIROTE 834 X-85 | Mitsubishi Chemical Corporation | Semisolid bisphenol A type epoxy resin | Epoxy equivalent weight 394 | 85% |
| | EPICLON 3100-70 | Dainippon Ink And Chemicals, Inc. | Novolac modified epoxy resin | Epoxy equivalent weight 457 | 70% |
| Gypsum | CALCINED PLASTER FT-2 (hemihydrate gypsum) | NORITAKE CO, LIMITED | Hemihydrate gypsum | — | 100% |
| | AS GYPSUM (anhydrous gypsum) | SAN ESU GYPSUM CO., LTD. | Anhydrous gypsum | — | 100% |
| Pigment | TTK TALC | Takehua kaguku kogyo Co., Ltd. | Extender pigment | — | 100% |
| | TAROXIL-XLO | Takn Kogyo Ltd. | Coloring pigment | — | 100% |
| | MICA POWDER 325 MESH | Fukuoka Talc Co., Ltd. | Extender pigment | — | 100% |

TABLE 1-continued

| Kind | Product name | Manufacturer | Substance | Remarks | Heating residue |
|---|---|---|---|---|---|
| Curing accelerator | M-CURE 400 | Seatomer Company | Poly functional actyl ester | — | 100% |
| Coupling agent | KBM-400 | Shin-Etsu Chemical Co., Ltd. | Silane coupling agent | — | 100% |
| Anti-sagging agent | DISPARLON 6650 | Kusumoto Chemicals, Ltd. | Thixotropic agent | — | 100% |
| Plasticizer | HIRENOL PL-10096 | KOLON | Petrolum resin (C9 hydrocarbon) | — | 100% |
| MXDA Mannich modified curing agent | MAD-204 (A) | OHTAKE MEISHIN CHEMICAL, CO. LTD. | MXDA Mannich modified amine | Active hydrogen equivalent weight: 202 (liquid) | 65% |
| | LUCKAMIDE VS-221 | Dainippon Ink And Chemicals, Inc. | MXDA Mannich modified amine | Active hydrogen equivalent weight: 80 (liquid) | 100% |
| Curing agent | LUCKAMIDE TD-966 | Dainippon Ink And Chemicals, Inc. | Aliphate modified amine | Active hydrogen equivalent weight: 327 | 60% |
| | ANCAMINE 2074 | Air Products and Chemicals, Inc. | Isophorone diamine modified amine | Active hydrogen equivalent weight: 92 | 100% |
| | ANCAMINE 2724 | Air Products and Chemicals, Inc. | Phenalkamine | Active hydrogen equivalent weight: 255 | 80% |
| | IETAMINE D-230 | Huntsman International LLC | Polyether amine | Active hydrogen equivalent weight: 60 | 100% |
| | CARDOLITE NC541LY | Cardolite Corporation | Ethylene diamine Mannich modified amine | Active hydrogen equivalent weight: 125 | 100% |
| Curing accelerator | VERSAMINE 8830 | KOGNIS | Tertiary amine | — | 100% |

Remark:
The epoxy equivalent weights and active hydrogen equivalent weight described are representation values.

Example 1

(Base Agent Component)

In a 1000 mL plastic container, EPIKOTE 834 X-85 (6.5 parts), EPICLON 5300-70 (6.5 parts), M-CURE 400 (2 parts), HiRENOL PL-1000S (2 parts), xylene (15 parts), n-butyl alcohol (7 parts), TTK TALC (29 parts), CALCINED PLASTER FT-2 (6 parts), MICA POWDER 325-MESH (7 parts), DISPARLON 6650 (1 part), TAROX LL-XLO (2 parts), and KBM-403 (1 part) were blended as listed in Tables 2A and 2B below, and glass beads (200 parts) were added thereto, followed by dispersing the resultant in a paint shaker for 1 hour. The obtained dispersion was filtered through a 60-mesh filter screen to prepare a base agent component (filtrate).

(Curing Agent Component)

In a 250 mL plastic container, MAD-204 (A) (10 parts), VERSAMINE EH30 (0.1 part), xylene (2.9 parts), and n-butyl alcohol (2 parts) were blended and dispersed in a paint shaker for 10 minutes until being homogeneous. The obtained dispersion was filtrated through a 60-mesh filter screen to prepare a curing agent component (filtrate).

Examples 2 to 9 and Comparative Examples 1 to 10

In each example, a base agent component and a curing agent component were prepared in the same manner as in Example 1 except that the kinds and amounts of the components blended into the base agent component and the curing agent component in Example 1 were changed as listed in Tables 2A and 2B below.

TABLE 2

| | | Examples | | | | | | | | | Comparative Examples | | |
|---|---|---|---|---|---|---|---|---|---|---|---|---|---|
| | | 1 | 2 | 3 | 4 | 5 | 6 | 7 | 8 | 9 | 1 | 2 | 3 |
| Base agent component | EPIKOTE 834 X-85 | 6.5 | 13 | 6.5 | 8 | 5 | 6.5 | 6.5 | 6.5 | 6.5 | 6.5 | 6.5 | 13 |
| | EPICLON 5300-70 | 6.5 | | 6.5 | 5 | 8 | 6.5 | 6.5 | 6.5 | 6.5 | 6.5 | 6.5 | 13 |
| | CALCINED PLASTER FT-2 (hemihydrate gypsum) | 6 | 6 | 6 | 6 | 6 | 10 | 15 | 6 | | | 6 | 6 |
| | AS GYPSUM (anhydrous gypsum) | | | | | | | | | 6 | | | |
| | TTK Talc | 29 | 29 | 29 | 29 | 29 | 25 | 20 | 29 | 29 | 35 | 41 | 23 |
| | TAROX LL-XLO | 2 | 2 | 2 | 2 | 2 | 2 | 2 | 2 | 2 | 2 | 2 | 2 |
| | Xylene | 15 | 15 | 15 | 15 | 15 | 15 | 15 | 15 | 15 | 15 | 3 | 8 |
| | n-Butyl alcohol | 7 | 7 | 7 | 7 | 7 | 7 | 7 | 7 | 7 | 7 | 7 | 7 |

TABLE 2-continued

|  |  | | | | | | | | | | | | |
|---|---|---|---|---|---|---|---|---|---|---|---|---|---|
|  | MICA POWDER 325-MESH | 7 | 7 | 7 | 7 | 7 | 7 | 7 | 7 | 7 | 7 | 7 | 7 |
|  | M-CURE 400 | 2 | 2 | 2 | 2 | 2 | 2 | 2 | 2 | 2 | 2 | 2 | 2 |
|  | KBM-403 | 1 | 1 | 1 | 1 | 1 | 1 | 1 | 1 | 1 | 1 | 1 | 1 |
|  | DISPARLON 6650 | 1 | 1 | 1 | 1 | 1 | 1 | 1 | 1 | 1 | 1 | 1 | 1 |
|  | HiRENOL PL-1000S | 2 | 2 | 2 | 2 | 2 | 2 | 2 | 2 | 2 | 2 | 2 | 2 |
|  | (Subtotal) | 85 | 85 | 85 | 85 | 85 | 85 | 85 | 85 | 85 | 85 | 85 | 85 |
| Curing agent component | MAD-204(a) | 10 | 10 | 4 | 4 | 4 | 4 | 4 | 2 | 2 | 4 | 4 | 6 |
|  | LUCKAMIDE V6-221 |  |  | 3 | 3 | 3 | 3 | 3 | 4 | 4 | 3 | 3 | 5 |
|  | LUCKAMIDE TD-966 |  |  |  |  |  |  |  |  |  |  |  |  |
|  | ANCAMINE 2074 |  |  |  |  |  |  |  |  |  |  |  |  |
|  | ANCAMINE 2724 |  |  |  |  |  |  |  |  |  |  |  |  |
|  | JEFFAMINE D-230 |  |  |  |  |  |  |  |  |  |  |  |  |
|  | CARDOLITE NC541LV |  |  |  |  |  |  |  |  |  |  |  |  |
|  | VERSAMINE EH30 | 0.1 | 0.1 | 0.1 | 0.1 | 0.1 | 0.1 | 0.1 | 0.1 | 0.1 | 0.1 | 0.1 | 0.1 |
|  | Xylene | 2.9 | 2.9 | 5.9 | 5.9 | 5.9 | 5.9 | 5.9 | 6.9 | 6.9 | 5.9 | 5.9 | 1.9 |
|  | n-Butyl alcohol | 2 | 2 | 2 | 2 | 2 | 2 | 2 | 2 | 2 | 2 | 2 | 2 |
|  | (Subtotal) | 15 | 15 | 15 | 15 | 15 | 15 | 15 | 15 | 15 | 15 | 15 | 15 |
|  | [Total] | 100 | 100 | 100 | 100 | 100 | 100 | 100 | 100 | 100 | 100 | 100 | 100 |
|  | PVC | 48 | 46 | 48 | 48 | 49 | 49 | 49 | 49 | 49 | 48 | 54 | 33 |
|  | Reaction ratio | 0.8 | 0.8 | 0.9 | 0.9 | 0.9 | 0.8 | 0.8 | 0.9 | 0.9 | 0.9 | 0.9 | 0.9 |
| Pencil hardness | After drying at 23° C. for 24 hours | B | 2B | HB | 2B | H | HB | HB | HB | HB | HB | 4B | 6B or less |
|  | After drying at 5° C. for 24 hours | 4B | 5B | 3B | 5B | 2B | 3B | 3B | 3B | 3B | 4B | 6B or less | 6B or less |
| Electrolytic protection test | Anti-fouling coating A — Appearance | Good | Good | Good | Good | Good | Good | Good | Good | Good | Blister 6D | Blister 6F | Blister 6F |
|  | Adhesive property (cross-cut test evaluation) | 0 | 0 | 0 | 0 | 0 | 0 | 0 | 0 | 0 | 3 | 3 | 3 |
|  | Detachment area | None | None | None | None | None | None | None | None | None | Base material surface | Base material surface | Base material surface |
|  | Anti-fouling coating B — Appearance | Good | Good | Good | Good | Good | Good | Good | Good | Good | Blister 6F | Blister 6F | Blister 6D |
|  | Adhesive property (cross-aid test evaluation) | 0 | 0 | 0 | 0 | 0 | 0 | 0 | 0 | 0 | 3 | 3 | 3 |
|  | Detachment area | None | None | None | None | None | None | None | None | None | Base material surface | Base material surface | Base material surface |

| | | Comparative Examples | | | | | | |
|---|---|---|---|---|---|---|---|---|
|  |  | 4 | 5 | 6 | 7 | 8 | 9 | 10 |
| Base agent component | EPIKOTE 834 X-85 | 12 | 4 | 6.5 | 4 | 6.5 | 6.5 | 6.5 |
|  | EPICLON 5300-70 | 12 | 4 | 6.5 | 4 | 6.5 | 6.5 | 6.5 |
|  | CALCINED PLASTER FT-2 (hemihydrate gypsum) | 6 | 6 | 6 | 6 | 6 | 6 | 6 |
|  | AS GYPSUM (anhydrous gypsum) |  |  |  |  |  |  |  |
|  | TTK Talc | 29 | 29 | 29 | 29 | 29 | 29 | 29 |
|  | TAROX LL-XLO | 2 | 2 | 2 | 2 | 2 | 2 | 2 |
|  | Xylene | 6 | 15 | 15 | 15 | 15 | 15 | 15 |
|  | n-Butyl alcohol | 5 | 7 | 7 | 7 | 7 | 7 | 7 |
|  | MICA POWDER 325-MESH | 7 | 7 | 7 | 7 | 7 | 7 | 7 |
|  | M-CURE 400 | 2 | 2 | 2 | 2 | 2 | 2 | 2 |
|  | KBM-403 | 1 | 1 | 1 | 1 | 1 | 1 | 1 |
|  | DISPARLON 6650 | 1 | 1 | 1 | 1 | 1 | 1 | 1 |
|  | HiRENOL PL-1000S | 2 | 2 | 2 | 2 | 2 | 2 | 2 |
|  | (Subtotal) | 85 | 80 | 85 | 80 | 85 | 85 | 85 |

TABLE 2-continued

| | | | | | | | | | |
|---|---|---|---|---|---|---|---|---|---|
| Curing agent component | MAD-204(a) | | 5 | | | | | | 2 |
| | LUCKAMIDE V6-221 | | 5 | | | | | | 1 |
| | LUCKAMIDE TD-966 | | | 17 | | | | | |
| | ANCAMINE 2074 | | | | 5 | | | | |
| | ANCAMINE 2724 | | | | | 11.5 | | | |
| | JEFFAMINE D-230 | | | | | | 3.7 | | |
| | CARDOLITE NC541LV | | | | | | | 7 | |
| | VERSAMINE EH30 | | 0.1 | 0.1 | 0.1 | 0.1 | 0.1 | 0.1 | 0.1 |
| | Xylene | | 2.9 | 0.9 | 7.9 | 6.4 | 9.2 | 5.9 | 9.9 |
| | n-Butyl alcohol | | 2 | 2 | 2 | 2 | 2 | 2 | 2 |
| | (Subtotal) | | 15 | 15 | 15 | 15 | 15 | 15 | 15 |
| | [Total] | | 100 | 100 | 100 | 100 | 100 | 100 | 100 |
| | PVC | | 38 | 48 | 48 | 48 | 49 | 46 | 53 |
| | Reaction ratio | | 0.9 | 0.9 | 0.9 | 0.9 | 0.9 | 0.9 | 0.4 |
| Pencil hardness | After drying at 23° C. for 24 hours | | 5B | 6B or less | 6B or less | 5B | 6B or less | 6B or less | 5B |
| | After drying at 5° C. for 24 hours | | 5B | 6B or less | 6B or less | 6B or less | 6B or less | 6B or less | 6B or less |
| Electrolytic protection test | Anti-fouling coating A | Appearance | Blister 6F | Blister 6D | Blister 6D | Blister 6D | Blister 6D | Blister 6D | Blister 6D |
| | | Adhesive property (cross-cut test evaluation) | 3 | 3 | 3 | 3 | 3 | 3 | 3 |
| | | Detachment area | Base material surface | Base material surface | Base material surface | Base material surface | Base material surface | Base material surface | Base material surface |
| | Anti-fouling coating B | Appearance | Blister 6D | Blister 6D | Blister 6D | Blister 6D | Blister 6D | Blister 6D | Blister 6D |
| | | Adhesive property (cross-aid test) evaluation | 3 | 3 | 3 | 3 | 3 | 3 | 3 |
| | | Detachment area | Base material surface | Base material surface | Base material surface | Base material surface | Base material surface | Base material surface | Base material surface |

(Measurement of Pencil Hardness in Low-Temperature Drying)

The base agent component and the curing agent component obtained in each example and comparative example were mixed and applied to a glass plate with a film applicator so that the thickness of the dried film was 100 μm, and the pencil hardness of the coating film dried at 23° C. or 5° C. for 24 hours was measured to confirm coating film strength.

(Electric Anticorrosion Adhesion Test for Layered Antifouling Coating Film)

The base agent component and the curing agent component obtained in each example and comparative example described above were mixed to obtain a composition.

The obtained composition was spray-coated on a brass plate (150 mm×70 mm×10 mm) manufactured by Nippon Testpanel Co., Ltd., to which columnar anticorrosion zinc of 2 cm (diameter)×1 cm (height) was attached with a lead wire (copper), so that the thickness of the dried film was 100 μm, and was dried at 23° C. for 24 hours, and an antifouling coating A or an antifouling coating B was thereafter spray-coated, so that the thickness of the dried film was 100 μm, and was dried at 23° C. for 24 hours to obtain a substrate with a layered antifouling coating film. The obtained substrate with the layered antifouling coating film was dipped in 3% salt water at 40° C. to conduct an electric anticorrosion test. The appearance and adhesive property after 60-day dipping were confirmed. The results are listed in Tables 2A and 2B.

For the appearance, the presence or absence of a blister, a crack, and detachment was evaluated by visual observation. The blister was evaluated based on ASTM D-714.

For the adhesive property, a knife test (cross cut test) was conducted to evaluate the presence or absence of a spot with deteriorated adhesive property and to evaluate a detachment area. The evaluation was conducted in four stages by cross-cut test evaluation points represented in Table 3 below.

TABLE 3

| Evaluation point (RN) | 0 | 1 | 2 | 3 |
|---|---|---|---|---|
| | | | | Detachment area: 50% or more |

The antifouling coating A (silicon type antifouling coating) was prepared by mixing 100 parts of organopolysiloxane (manufactured by Shin-Etsu Chemical Co., Ltd., 20000 cs/25° C.) represented by the following formula (1), 30 parts of silicone oil SH550 (manufactured by Dow Corning Toray Co., Ltd.), and 30 parts of xylene.

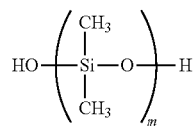
(1)

The antifouling coating B (hydration decomposition type antifouling coating) was prepared by mixing blending components listed in Table 4 below in blending amounts listed in Table 4 below.

TABLE 4

| Kind | Product name | Manufacturer | Substance | Blending amount |
|---|---|---|---|---|
| Resin | LAROFLEX MP-25 | BASP | Poly vinyl chloride/poly-vinyl acetate copolymer | 7 weight parts |
| | ROSIN | Made in China | Rosin | 7 weight parts |
| Anti-settling agent | DISPARLON 4200-20X | Kusumoto Chemicals, Ltd. | Anti-settling agent | 2 weight parts |
| Coloring pigment | BENGALA 404 | MORISHITA BENGARA KOGYO CO., LTD. | Coloring pigment | 1 weight part |
| Antifoulant | CUPROUS OXIDE NC-301 | NISSIN CHEMCO Co., Ltd. | Cuprous oxide | 45 weight parts |
| | COPPER OMADINE | Arch Chemicals | Copper pyrithione | 1 weight part |
| Extender pigment | TALC FC-1 | Fukuoka Talc Co., Ltd. | Extender pigment | 3 weight parts |
| Anti-sagging agent | DISPARLON 630-20X | Kusumoto Chemicals, Ltd. | Thixotropic agent | 2 weight parts |
| Solvent | XYLENE | Mitsui Chemicals, Inc. | Solvent | 27 weight parts |
| | METHYL ISOBUTYL KETONE | Mitsui Chemicals, Inc. | Solvent | 5 weight parts |

The invention claimed is:

1. A two-component primer, comprising:
a base agent component comprising an epoxy resin, and
a curing agent component comprising a meta-xylenediamine Mannich modified curing agent,
said two-component primer further comprising:
a gypsum, excluding crystal gypsum, and
a pigment, excluding gypsum,
wherein a volume concentration of the gypsum and the pigment in a dry coating film formed with the two-component primer is from 43 to 50%.

2. The two-component primer according to claim 1, wherein said base agent component further comprises at least a part of said gypsum and at least a part of said pigment.

3. A layered antifouling coating film, comprising:
a primer coating film obtained from a two-component primer and
an antifouling coating film formed on a surface of the primer coating film,
wherein the two-component primer comprises
a base agent component comprising an epoxy resin, and
a curing agent component comprising a meta-xylenediamine Mannich modified curing agent,
said two-component primer further comprising:
a gypsum, excluding crystal gypsum, and
a pigment, excluding gypsum,
wherein a volume concentration of the gypsum and the pigment in the primer coating film is from 43 to 50%, and
wherein the antifouling coating film comprises a coating film obtained from a silicone resin-comprising composition.

4. The layered antifouling coating film according to claim 3, wherein the epoxy resin comprises a bisphenol epoxy resin.

5. The layered antifouling coating film according to claim 4, wherein the epoxy resin further comprises a novolac epoxy resin.

6. The layered antifouling coating film according to claim 3, wherein a reaction ratio between the epoxy resin and the curing agent is from 0.5 to 1.0.

7. The layered antifouling coating film according to claim 3, wherein a content of the gypsum in the primer is 5 to 300 parts by weight based on 100 parts by weight of the epoxy resin.

8. The layered antifouling coating film according to claim 3, wherein the primer further comprises a curing accelerator.

9. The layered antifouling coating film according to claim 3, wherein the primer further comprises a petroleum resin.

10. A ship propeller, comprising thereon the layered antifouling coating film according to claim 3, wherein said ship propeller is a nonferrous metal ship propeller.

11. A method for preventing a base material from being fouled, the method comprising:
covering a surface of the base material with the layered antifouling coating film according to claim 3 in order of the base material, the primer coating film, and the antifouling coating film.

12. The method according to claim 11, wherein the base material is a nonferrous ship propeller.

13. The layered antifouling coating film according to claim 3, wherein the volume concentration of the gypsum and the pigment in the primer coating film is from 45 to 50%.

14. The layered antifouling coating film according to claim 13, wherein the gypsum is hemihydrate gypsum.

15. The layered antifouling coating film according to claim 14, wherein the hemihydrate gypsum is α type hemihydrate gypsum.

16. The layered antifouling coating film according to claim 13, wherein the gypsum is anhydrous gypsum.

17. The layered antifouling coating film according to claim 3, wherein the primer comprises (i) a bisphenol A epoxy resin or a bisphenol F epoxy resin and (ii) a novolac type epoxy resin, wherein a rate thereof (i):(ii) is, by mass ratio, 300:100 to 100:300.

18. The layered antifouling coating film according to claim 3, wherein the meta-xylenediamine Mannich modified curing agent comprises a curing agent that is solid at 25° C. and a curing agent that is liquid at 25° C.

19. The layered antifouling coating film according to claim 3, wherein the silicone resin-containing composition is a composition comprising an organopolysiloxane having at least condensation-reactive functional groups.

20. The layered antifouling coating film according to claim 3, wherein said base agent component further comprises at least a part of said gypsum and at least a part of said pigment.

* * * * *